Figure 1:
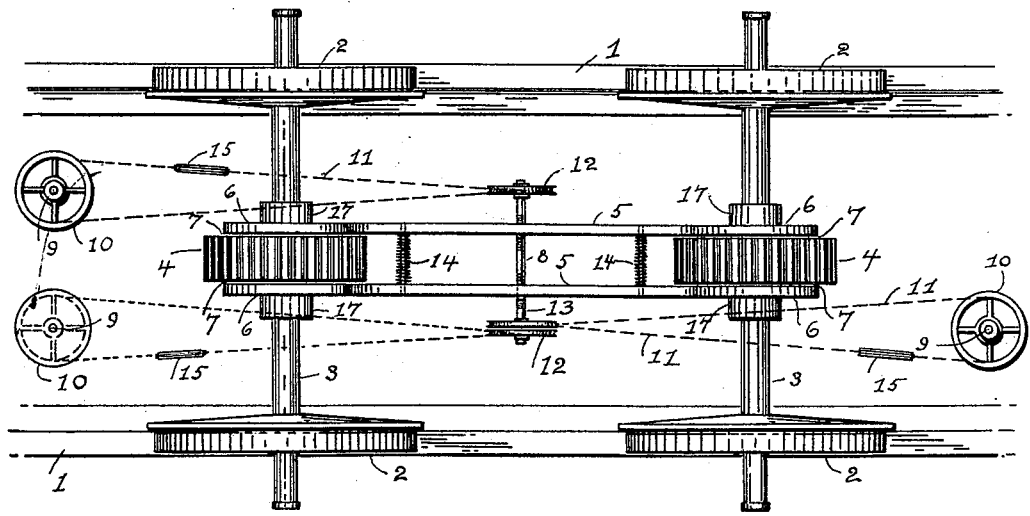

(No Model.)

H. E. PUTNEY.
BRAKE MECHANISM.

No. 581,490.  Patented Apr. 27, 1897.

WITNESSES
H. H. Martin
Maud Schumacher

INVENTOR
Herbert E. Putney
By William Webster
Atty

UNITED STATES PATENT OFFICE.

HERBERT E. PUTNEY, OF TOLEDO, OHIO, ASSIGNOR OF ONE-HALF TO HENRY WILE AND M. D. PUTNEY, OF SAME PLACE.

BRAKE MECHANISM.

SPECIFICATION forming part of Letters Patent No. 581,490, dated April 27, 1897.

Application filed January 23, 1897. Serial No. 620,405. (No model.)

*To all whom it may concern:*

Be it known that I, HERBERT E. PUTNEY, of Toledo, county of Lucas, and State of Ohio, have invented certain new and useful Improvements in Brake Mechanism; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to a brake mechanism having especial relation to a provision for applying a plurality of friction-brakes upon the moving parts of a car, and especially to that class of cars used in transporting passengers within corporation limits.

I will describe my invention in connection with an electric street-railway car, although it will be apparent that it can be successfully adapted to other classes of moving vehicles.

The object of the invention is to provide for simplicity in construction and adaptability to different parts and consequently to different locations of the car, and also to provide for maximum friction with a minimum exertion upon the part of the operator.

Other objects of the invention will be rendered apparent in the description and claims, as, for instance, I have attained to what I consider perfection in a supplemental arrangement by which provision is made to control not only the initial motor—to wit, the electrically-operated car—but a trailer or trailers drawn thereby. In the branch of the art to which I have more especially referred— to wit, that of electric street-railway cars— there are several features of importance to be observed in the application of a brake mechanism, among which may be named the fact that in the intricate machinery employed there is necessarily considerable room occupied beneath the car; second, the speed attained renders it desirable that an immediate frictional contact of the brake with its coincident friction-surface can be made to check the speed of the car at the will of the operator or motorman, and, third, that the controllability by the operator or motorman shall be such that it shall be at his command without detracting his attention from the controllability of the current or its application of the motor. I have attained these objects not only in the simplification of the brake mechanism, which comprises a minimum number of parts adjustable in harmony with the arrangement of the driving mechanism, but also in its connection with the brake-lever renders it convenient of application without undue attention on the part of the operator or motorman.

Figure 2:
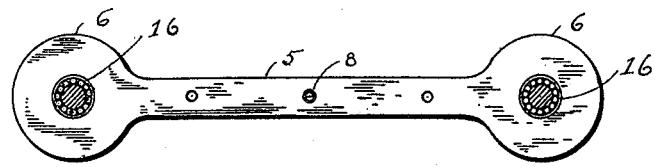

In the drawings, Figure 1 is a top plan view of a truck of a car geared for an electric motor, showing the brake mechanism and means for actuating it, the full lines indicating controllability from each end of the car by single belt or chain mechanism and the dotted lines showing a modification in which there are two separate belt mechanisms for actuating the brake-shoes. Fig. 2 is an elevation of a brake-shoe; and Fig. 3, a sectional detail view of a means for connection with the energized car, whereby the trailer may be simultaneously impeded by the brake mechanism.

1 designates the rails, upon which the truck-wheels 2 travel, 3 the axle, and 4 4 the gearing for connection with the dynamo or driving mechanism.

I have illustrated the brake mechanism as applicable directly to the gears 4 4, although I wish it distinctly understood that I may attach supplemental friction-disks permanently upon the axles 3 3 and apply the brake mechanism with the same effect.

5 5 designate what I shall hereinafter call "brake-levers," having upon each end brake-shoes 6 6 for frictional contact with the surface secured upon the axles 3.

The brake-levers 5 are in parallel relation and in attaining the object of stopping the car are to be simultaneously actuated to cause the brake-shoes 6 to frictionally contact with the friction-surfaces 7 of the gears 4 or the equivalent disks upon the axle. This object is attained by means of a screw passing through screw-threaded orifices 8, approximately central of the length of the levers 5 and differentially screw-threaded, whereby a revolution of the screw in the proper direction will draw the two levers together and effect the frictional contact of the shoes 6 with the surface 7, and a reverse movement will separate the parts to relieve the friction.

9 9 designate the brake-lever standards, upon which are wheels 10 10, over which are rived a continuous chain, rope, or cable 11, which are coiled around a wheel 12, attached to the aforementioned screw 13, whereby a turn of the brake-lever standard 9 will actuate the screw to apply the brakes or disengage the same.

In order to expedite the separation of the brake levers and shoes, there are interposed springs 14. In order to properly adjust the chain, rope, or cable 11, there are interposed turnbuckles 15 15 or any other preferred means for securing the proper tension. In order to avoid friction upon the axle, the brake-shoes are supplied with antifriction-rollers 16, which bear upon the axle.

In the modification shown in Fig. 1 there may be employed a plurality of wheels 12 to adapt the brake to the present construction of gears, in which the brake-levers 9 are upon different sides of the platform. In this construction the same character of connection 11 is employed.

In order to limit the movement of the brake shoes and levers, collars 17 are secured upon the axle 3.

Figure 3:
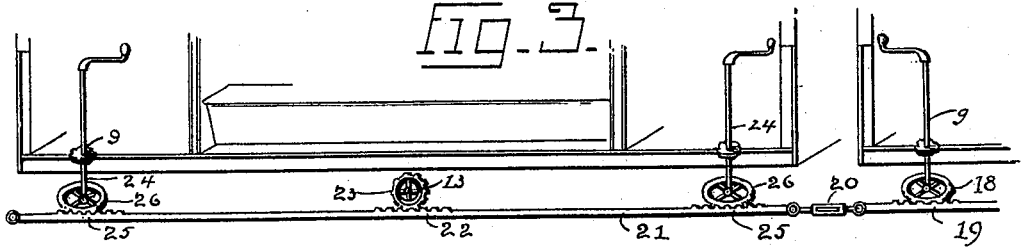

In Fig. 3 is illustrated a supplemental attachment by which the brake mechanism can be attached to a trailer. In this provision there is secured upon the lower end of the shaft 9 a gear 18, which meshes in a rack-bar 19, connected by a universal coupling 20 with a bar 21 upon the trailer, having a rack-bar 22 in mesh with a pinion 23 upon the screw 13, whereby a like arrangement of brake-levers and brake-shoes as has heretofore been described is actuated by the revolution of the screw, the screw being actuated by the rack-bar 22 upon the shaft 21.

In order to provide for controllability by reason of the brake-levers 24 upon the trailer, there are arranged rack-bars 25 25 upon the bar 21 and gears 26 26 upon the brake-levers 24, so that a revolution of the brake-lever will actuate the screw 13 in the same manner as that described heretofore.

What I claim is—

1. In a brake mechanism for electric cars, the front and rear axle, gears secured thereon, friction-levers arranged upon each side of the gears having brake-shoes upon each end, and a differential screw tapped through screw-threaded orifices of like pitch with means controllable by the brake-shaft for advancing or retracting the screw.

2. In a brake mechanism for electric cars, a plurality of parallel brake-levers having brake-shoes attached at each end of each lever, friction-surfaces upon the gear mechanism interposed between the brake-shoes of each end, means controllable by the brake-shaft for actuating the brake-shoes, and a trailer-car attached to the motor-car having a like brake mechanism actuated by a rack-bar and pinion controllable by the brake-shaft.

3. In a brake mechanism for cars, revoluble axles, a fixed friction-disk upon the axles, brake-shoes journaled upon each side of the friction-disk having antifriction-rollers bearing upon the axles, and means for retracting or advancing the friction-disks.

In testimony that I claim the foregoing as my own I hereby affix my signature in presence of two witnesses.

HERBERT E. PUTNEY.

Witnesses:
WILLIAM WEBSTER,
MAUD SCHUMACHER.